Figure 5:
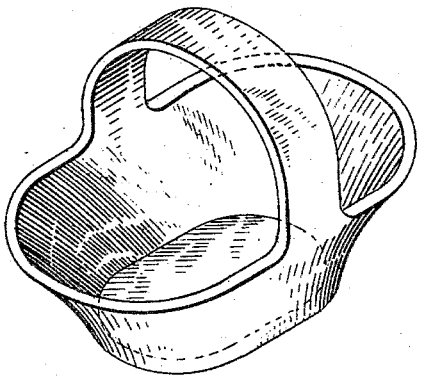

(No Model.) 2 Sheets—Sheet 1.
J. HOARE.
MANUFACTURE OF GLASS BASKETS.
No. 296,691. Patented Apr. 8, 1884.
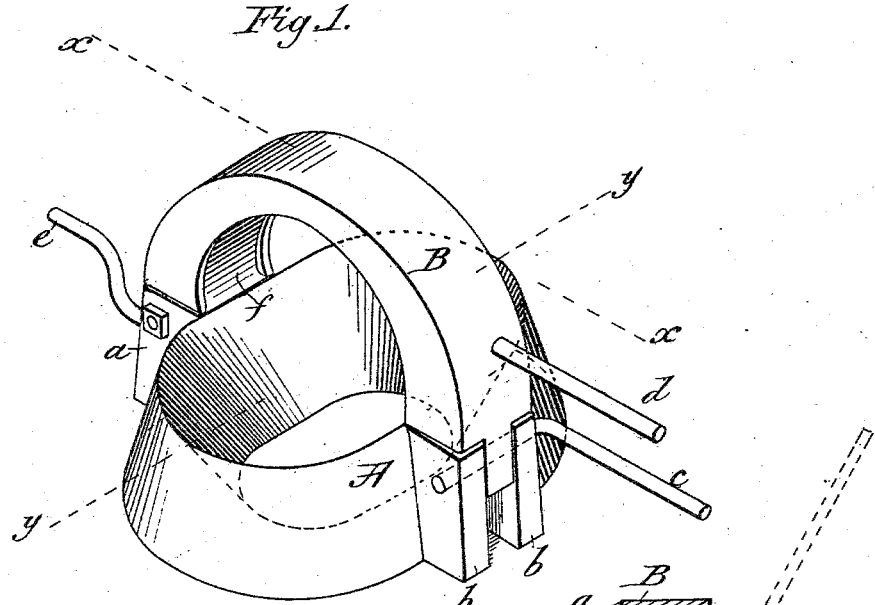
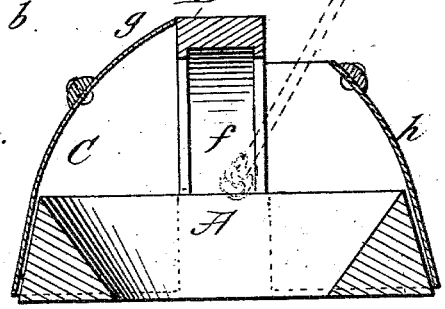
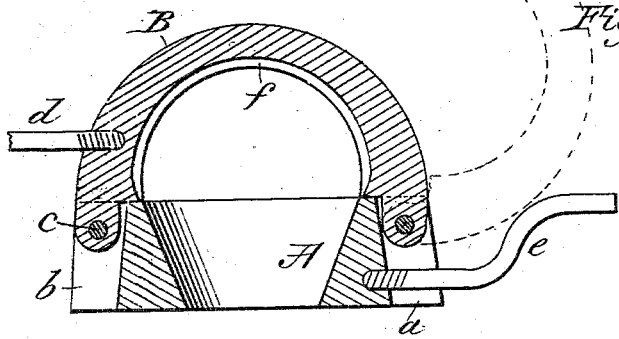
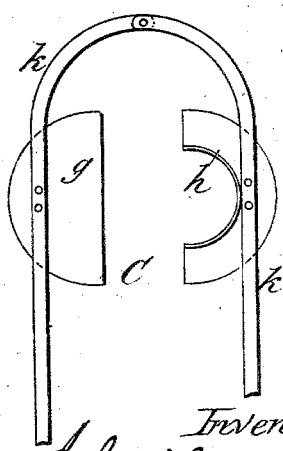
Attest:
F. H. Schott
A. R. Brown
Inventor:
John Hoare,
Pr C. H. Watson & Co.
attys.

(No Model.)

2 Sheets—Sheet 2.

J. HOARE.
MANUFACTURE OF GLASS BASKETS.

No. 296,691. Patented Apr. 8, 1884.

Attest:
F. H. Schott
A. R. Brown.

Inventor:
John Hoare
C. H. Watson & Co.
attys

UNITED STATES PATENT OFFICE.

JOHN HOARE, OF CORNING, NEW YORK.

MANUFACTURE OF GLASS BASKETS.

SPECIFICATION forming part of Letters Patent No. 296,691, dated April 8, 1884.

Application filed December 5, 1883. (No model.)

*To all whom it may concern:*

Be it known that I, JOHN HOARE, a citizen of the United States, residing at Corning, in the county of Steuben and State of New York, have invented certain new and useful Improvements in Manufacture of Glass Baskets, of which the following is a specification, reference being had therein to the accompanying drawings.

This invention relates to the art of manufacturing glass baskets or dishes with handles in one piece.

The invention is illustrated in the annexed drawings, in which—

Figure 1 is a perspective view of my improved mold for use in blowing glass baskets and analogous articles. Fig. 2 is a section of the same on the line $x$ $x$ of Fig. 1. Fig. 3 is a section on the line $y$ $y$ of Fig. 1, with hood in place. Fig. 4 is a top or plan view of my improved adjustable hood for glass-molds. Fig. 5 is a perspective view of a glass basket with handle, all in one piece.

Like letters of reference designate like parts in the several views.

The body of the mold A is preferably formed of metal, and is made with an interior surface corresponding to the shape to be imparted to the exterior of the glass basket, dish, or analogous article. This mold is provided on opposite sides with lugs $a$ $b$, for the attachment of the handle part or yoke B, which is that portion of the mold against which the basket-handle is blown. The handle part or yoke B is preferably hinged at one end to the lugs $a$ $a$, so as to be thrown back when not required for use, its opposite end, when in use, being received between the lugs $b$ $b$, and secured by a pin, $c$, passed through the lugs and yoke. The movable yoke B is manipulated by means of a handle, $d$, which also serves, in connection with a handle, $e$, attached to the opposite side of the mold, as a means of lifting and carrying the mold when heated.

Instead of forming the movable yoke B as shown, it may be made in two parts, hinged at each end and secured in the middle; or it may be pivoted at each end and arranged to be turned down at one end of the mold when not needed. The under side of this yoke B is grooved at $f$, to correspond in width and depth with the thickness of the basket-handle.

The hood or mold-cover C is formed in two unequal parts, $g$ $h$, attached to the pivoted handles $k$ $k$, and is arranged so as to nearly surround the mold, for the purpose of confining the plastic glass while blowing the basket-handle, thus securing a uniform thickness in the various parts of the article made.

In the manufacture of glass baskets and dishes, or analogous articles having basket or bow handles, the mold is employed as follows: The yoke B having been thrown back, the workman takes up a quantity of plastic glass with the blowing iron or tube, and after inserting the same in the interior of the mold A proceeds to blow the glass about against the sides of the same. The yoke B is then thrown across the mold and secured, and the hood C having been adjusted the blowing is continued until the basket-handle is complete. It will be seen that the open space between the yoke B and the smaller part, $h$, of the adjustable hood is sufficient to admit the end of the blowing-tube, and at the same time enable the operator to observe the progress of the work.

Glass baskets, dishes, and similar glass articles, with bow handles formed integral therewith, may thus be readily made.

Having thus described my invention, what I claim as new, and desire to secure by Letters Patent, is—

1. A glass-blower's mold for forming glass baskets and similar articles with integral bow-handles, consisting of the mold A and movable yoke B, substantially as described.

2. The combination, with a glass-blower's mold, of the adjustable hood C, substantially as described.

3. The combination of the mold A, movable yoke B, and adjustable hood C, substantially as described.

In testimony whereof I affix my signature in presence of two witnesses.

JOHN HOARE.

Witnesses:
   GEO. E. EATON,
   M. L. SAGE.